May 7, 1935.  W. B. STOUT  2,000,360
AUTOMOBILE
Filed April 27, 1932  2 Sheets-Sheet 1

INVENTOR
William B. Stout.
BY
Harness Dickey Pierce & Hamm
ATTORNEYS

May 7, 1935.  W. B. STOUT  2,000,360
AUTOMOBILE
Filed April 27, 1932  2 Sheets-Sheet 2
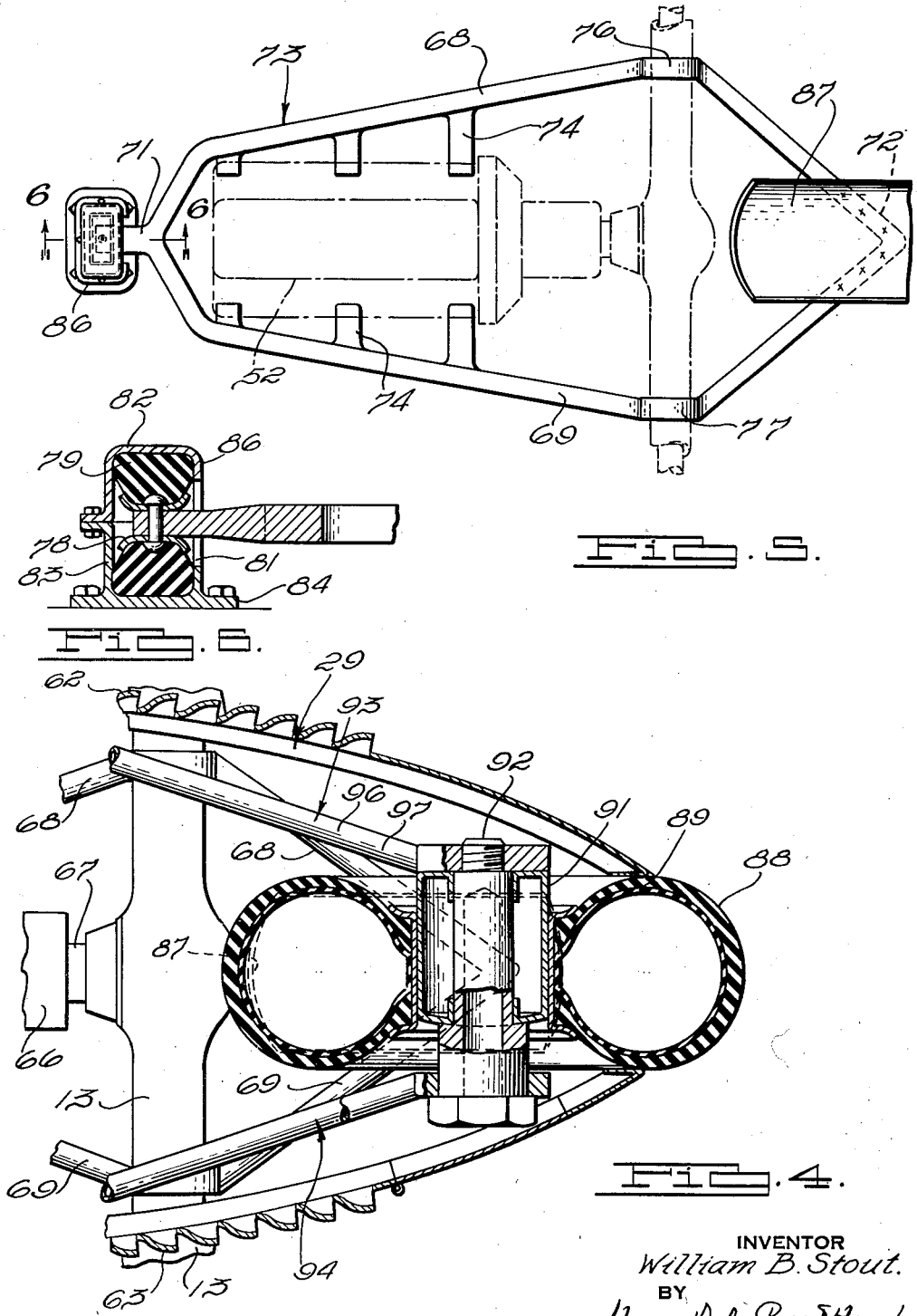
INVENTOR
William B. Stout.
BY
Harness Dickey Pierce & Hann
ATTORNEYS Patented May 7, 1935

2,000,360

UNITED STATES PATENT OFFICE 2,000,360

AUTOMOBILE

William B. Stout, Detroit, Mich.

Application April 27, 1932, Serial No. 607,811

3 Claims. (Cl. 180—54)

This invention relates to motor vehicles and has particular relation to a construction and arrangement of elements for absorbing and dissipating shocks and vibrations developed internally and externally thereof.

An object of the invention is to simplify the construction of motor vehicles by the practical elimination of expensive springs, chassis frames, bumpers and other devices now generally employed in the construction of motor vehicles and the substitution therefor of light and integral frame and body constructions supported by relatively large tires carrying an unusually low unit air pressure and capable of absorbing internally thereof practically all of the objectionable road shocks and vibrations resulting from vehicle operation.

Another object of the invention is to advantageously employ the extra tires for a motor vehicle by mounting them removably in the front and/or rear ends of a motor vehicle body in such manner as to project outwardly therefrom for resilient engagement with anything with which the vehicle may come in contact in such regions.

Another object of the invention is to provide a resilient engine mount for absorbing a large part of the engine vibrations without the transmission thereof first to the motor vehicle body.

Another object of the invention is to employ a spare tire for effectively insulating a motor vehicle body from the vibrations caused by the operation of the engine thereof.

Another object of the invention is to provide a resilient air inflated engine support or mounting capable of serving both for supporting the engine and partially supporting the motor vehicle body.

Another object of the invention is to employ usefully the ordinarily wasted shock-absorbing properties of a spare tire with which automobiles now generally are provided.

Another object of the invention is to provide a motor vehicle in which a greater portion of the road shocks, developed by the operation thereof, is absorbed directly in unusually large and resilient tires and in which by comparison only a small portion of such shocks is absorbed in simple and inexpensive body movement restricting devices employed between the axles and the body.

Another object of the invention is to eliminate as far as possible the large amount of relative motion between motor vehicle bodies and the axles thereof which is inherent in such vehicles as now constructed.

Another object of the invention is to eliminate, practically, the undesirable effect of unsprung weight inherent in automobiles as now constructed by transferring the greater portion of the function of the vehicle springs from between the body and axles thereof to large low pressure cushioned tires upon which all of the vehicle weight is supported.

Another object of the invention is to provide means for cooling the engine of a motor vehicle by taking advantage of zones of widely differing pressures caused by the operation of the vehicle for aiding in the circulation of air across the engine and the radiator embraced in the cooling system thereof.

Another object of the invention is to provide a vehicle body which is light and rigid enough to take advantage of the excellent shock absorbing qualities of large low pressure cushion tires.

Another object of the invention is to employ in the construction of automobiles, the same or substantially the same type of large low pressure pneumatic tires which have been developed and perfected for landing airplanes on rough fields.

The form of the invention disclosed particularly for the purpose of illustration comprises generally a unitary and internally reinforced shell comprising the entire body and frame of a motor vehicle and which is supported, either directly or by simple and resilient supports, upon axle housings having low pressure cushioned tires operatively mounted upon the outer ends thereof. While the size of these tires will depend somewhat upon the weight of the body they should be made large enough, internally flexible enough and inflated to a pressure low enough that substantially all of the objectionable road shocks caused by the operation of the vehicle are absorbed therein.

In the front and rear ends of the vehicle are mounted spare inflated wheels similar to those employed on the outer ends of the axle, and interchangeable therewith, and which project outwardly of the body in such manner as to provide bumpers for absorbing shocks caused by collision with other vehicles or objects.

The engine is mounted in the rear end of the body upon supports resiliently secured to the body at the opposite ends thereof and suspended intermediate the ends upon the rear axle through which the vehicle is driven. One of the resilient elements by which the engine supports are engaged comprises a spare wheel of the vehicle mounted in the rear end of the body thereof and also serving as a bumper therefor.

In the side portions of the vehicle shell or body and directly in front of the engine and radiator thereof are openings communicating with regions or zones of relatively high pressure air which are created by the vehicle during the operation thereof. The shell also is provided with openings or louvres in the opposite sides thereof and adjacent the rear end of the body in a region of relatively low atmospheric pressure which is caused by the formation of the body and its forward movement through the air.

For a better understanding of the invention, reference may be had to the accompanying drawings in which:

Fig. 4 is a fragmentary horizontal sectional view of the automobile structure taken substantially on line 4—4 of Fig. 1 and looking in the direction of the arrows thereon;

Fig. 5 is a fragmentary horizontal sectional view of the vehicle illustrating particularly in plan the mounting by which the engine of the vehicle is supported and Fig. 6 is a fragmentary vertical sectional view of the mounting taken substantially on line 6—6 of Fig. 5.

Figure 1:
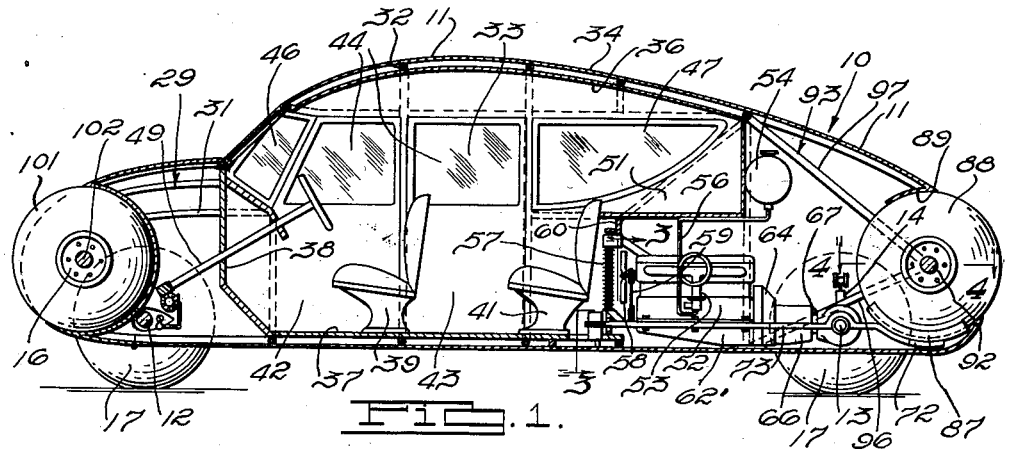
Figure 1 is a longitudinal vertical sectional view through an automobile embracing the principles of the invention.
Figure 2:
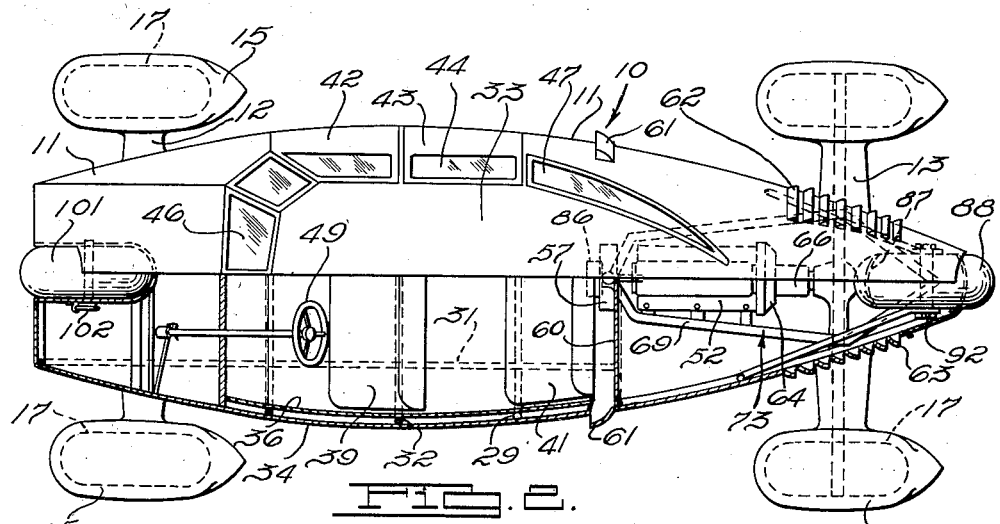
Fig. 2 is a partly plan and partly a horizontal sectional view through the automobile disclosed by Fig. 1.
Figure 3:
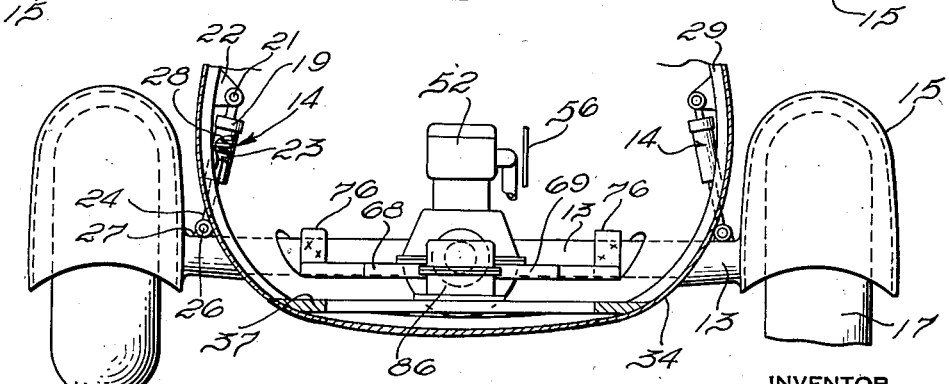
Fig. 3 is a fragmentary transverse sectional view through the automobile disclosed by Figs. 1 and 2 as the latter might appear substantially on line 3—3 of Fig. 1 and looking in the direction of the arrows thereon.

Referring particularly to the drawings, the motor vehicle 10, embracing the invention comprises a body 11 supported on front and rear axles 12 and 13. Rotating hubs or relatively small wheels 16 operatively associated with the opposite ends of the axles 12 and 13 have secured thereon large relatively flexible cushion tires 17 having an inherent flexibility and a cross-sectional area great enough that the tires when inflated to a relatively low pressure will be distorted easily by any irregularities in the surface upon which the motor vehicle travels and will absorb internally thereof the shocks which might otherwise be transmitted to the vehicle body through the axles thereof.

The tires are constructed with an unusually flexible carcass which is easily deformed by relatively large objects with which they may come in contact during the operation of the automobile, thus permitting the latter to pass over such objects practically without sensible vibrations or shocks therefrom. With such tires it is unnecessary to employ springs between the vehicle axles and the body thereof for permitting a large amount of relative movement between the axles and body. In motor vehicles as now constructed such movement is caused by the rising of the tires upon objects contacted with, owing to the high pressure and inflexible side walls of such tires which render them capable of supporting the vehicle thereupon rather than of receiving the objects internally thereof.

The tires are of small outside diameter compared with the cross-sectional area and the cushioning effect thereof, due to the large reduction in the inside diameter made possible by use of hubs rather than ordinary wheels for mounting them. Inflation pressures of five to ten pounds per square inch have been found very satisfactory with light bodies of the type disclosed hereinafter, although the pressures and sizes of tires may vary beyond these limits under different circumstances.

Movement restricting members or "Oleos" 14 are employed on the rear axle 13 principally for the purpose of permitting relative adjustment between the axles and the body, while preventing the swaying of the body caused by the contour of the surface upon which the vehicle is operated.

While any preferred type of movement restricting devices may be employed, the members 14 as illustrated, comprise cylindrical casings 19 secured pivotally as indicated at 21 to brackets 22 projecting from the frame of the body 10 and in which are received the enlarged piston like ends 23 of rods 24. These rods are secured as indicated at 26 to bosses 27 formed on the vehicle axle 13 adjacent the outer extremities thereof. The ends 23 may be movably confined within the cylinders 24 against relatively light coil springs, such as that indicated at 28, which engage the upper ends of the cylinders. The pistons 23 are provided with openings which permit the restricted passage therethrough of oil contained within the cylinders.

The principal purpose of these springs is to provide an equilibrium position for the body upon the axles and to equalize the load upon the different vehicle wheels.

The body 11 comprises essentially a skeleton frame 29 consisting of a plurality of longitudinally and transversely disposed tubular or other bows 31 and 32, respectively, welded together at their intersecting portions to provide a load sustaining and shock absorbing frame having an interiorly disposed passenger compartment 33 and an exterior formation against which air currents from any direction will have a minimum of effect. The frame is covered externally by a smooth sheet metal or other suitable covering 34, and internally of the passenger compartment 33, by a covering 36; except in the lower region thereof where a floor 37 is provided and which terminates at the front end in the lower extremity of a dash 38. Front and rear seats 39 and 41 are disposed in the passenger compartment 33 substantially midway between the front and rear axles. The body has doors 42 and 43 on opposite sides thereof with transparent windows 44 therein which are aligned with the sections of a windshield 46 and with windows 47 on opposite sides of the body and rearwardly of the doors.

A steering mechanism 49, projecting within the passenger compartment, controls the angular position of the front wheels 17 for determining the path of movement of the vehicle.

Behind the rear seat 41 is a partition 51 beneath a portion of which is disposed an engine 52 for supplying power for driving the vehicle. The fuel supply system for the engine comprises a charge forming device 53 for supplying a combustible mixture of fuel and air to the engine which in turn is supplied with liquid fuel through a flexible fuel supply line 56 from a tank 54 supported by the partition 51. The cooling system for the engine 52 comprises a vertically disposed radiator 57 positioned between the front end of the engine and the back of the rear seat 41 and through which a circulation of air is partially induced by a fan 58 driven by the engine through a belt 59. At the front side of the radiator 57 there is provided any suitable number of openings through any parts of the body covering 34 and along the rear edges of which are secured air scoops 61 for deflecting the air within the openings along a baffle 60 and through the radiator 57. On opposite sides of the body 11 are formed louvres 62 and 63 through which the air circulating through the radiator 57 and over the exterior surface of the engine 53, in response to the motion of the vehicle and the operation of the fan 58, is discharged.

The engine 52 also is provided with a crank case 62' on the rear end of which is secured a clutch housing 64 which in turn supports a transmission housing 66 from the rear end of which extends a propeller shaft 67. The rear axle 13 preferably is provided with differential and other mechanism commonly employed in the driving axles of motor vehicles and to which the propeller shaft 67 is operatively connected. The clutch and transmission mechanisms of the vehicle, enclosed in the casings 64 and 66, are provided with suitable control mechanisms accessible to the vehicle operator within the passenger compartment 33.

For supporting the engine 52 there is provided a pair of supports 68 and 69 joined together at opposite ends, as indicated at 71 and 72, to provide an engine mounting 73. Adjacent the front end of the supports 68 and 69 and projecting inwardly thereof are brackets 74 to the inner extremities of which the engine 52 is rigidly or otherwise secured. Behind the engine 52 the supports 68 and 69 are provided with upwardly projecting arcuate portions 76 and 77 in which portions of the rear axle 13 are rigidly secured.

The front end portion 71 of the engine mounting 73 is provided on the upper and lower surfaces thereof with cups or bearing members 78 for receiving therein the adjacent surfaces of oppositely disposed resilient blocks 79 and 81. The supporting surfaces of these blocks are engaged by oppositely disposed bracket sections 82 and 83 of a bracket 86 and the latter of which is provided with flanges 84 by which the bracket is secured rigidly to an adjacent portion of the vehicle frame 29. The opposite extremity of the mounting 73 has rigidly secured thereto an arcuate supporting member 87 formed to fit a portion of the surface of an inflated spare wheel 88 or other suitable resilient member. While the wheel may be supported in any desired position, in the present instance it is disposed in a vertical plane extending longitudinally with respect to the body 11 and with a portion thereof projecting through an opening 89 in the rear end of the body in such position that the edge of the wheel will be engaged by any object with which the rear end of the vehicle comes in contact.

The wheel comprises a hub 91, which may or may not be similar to those employed on the axles of the vehicle, and which is rigidly secured by a large bolt 92 between the rear ends of a spaced pair of brackets 93 and 94. These brackets each comprises arms 96 and 97 secured rigidly to upper and lower portions of the frame 29.

The front end of the body also is provided with a spare wheel 101 which is secured by a bolt in an opening formed therein in such manner that a portion of the tire of the wheel projects outwardly of the body to be engaged by anything with which the vehicle comes in contact.

When the vehicle is running upon a rough highway or elsewhere, the softly inflated tires thereof will deform easily and without the loss internally of any considerable amount of energy, to conform to the surface on which the vehicle is supported and without transmitting to the vehicle axles shocks and vibrations ordinarily encountered when employing highly inflated and relatively non-flexible tires.

It is to be observed that the load at the rear end of the body 11 is carried by the rear spare tire 88 which also tends resiliently to balance, upon the axle 13, the weight of the engine 52 at the opposite end of the engine mounting frame 73. In other words, the axle 13 acts as a fulcrum on opposite sides of which the weight of the engine and a portion of the weight of the vehicle are approximately balanced. By reason of this mounting the major portion of the weight of the engine is transmitted to the rear axle 13 without affecting the body 11 to any appreciable extent, other than through the blocks 79 and 81 which at intervals resiliently resist forces tending to interfere with the normal equilibrium positions of the engine and body.

In the event it becomes necessary to remove the rear spare wheel 88 for repairs or otherwise it is possible to continue the operation of the vehicle under reasonably satisfactory conditions by reason of the suspension of the engine between the resilient mounting 86 and the rear axle 13. The weight of the portion of the engine supported by the body in turn will be transmitted to the axle 13 through the movement restricting members 14. Under such conditions the body will be affected by a somewhat greater proportion of shocks and vibrations, due to engine operation and to movement of the vehicle, but it will be possible to proceed at a moderate speed to the nearest service station where repairs can be made that will permit the replacement of the spare tire. Such conditions will arise only under very unusual circumstances inasmuch as the front tire is available for service upon the vehicle without interfering with the engine mounting and it is only when two tires are required for replacement purposes that the rear spare tire need be employed.

While the structure as disclosed constitutes a preferred form and application of the invention, there are numerous modified equivalent forms thereof within the scope of the invention as defined by the appended claims.

I claim:

1. In a motor vehicle, in combination, a body having an engine compartment in the rear end thereof, an engine in said compartment, a seat in said body having a back spaced forwardly of the forward wall of said compartment, said wall having an opening therein, means for introducing air into the space between said back and said wall, said compartment being provided with means for the egress of air therefrom introduced thereto from said space through said opening, a radiator positioned in the path of flow of air between said space and said compartment, and connections between said radiator and said engine.

2. In a motor vehicle, in combination, a body having a rearwardly tapering tail portion, a wall extending across said portion forming an engine compartment therein, an engine in said compartment, said wall having an opening therein, a radiator in said opening operatively connected with said engine, said body having air inlet openings in the opposite side walls thereof in advance of said cross wall and in open communication with said opening, and openings in the walls of said engine compartment for the egress of air flowing through said radiator.

3. In a motor vehicle, in combination, a body having a transverse wall connecting opposite side walls thereof adjacent the rear end thereof and forming an engine compartment in said body rearwardly of said wall, a seat positioned forwardly of said wall forming a second compartment between it and said wall, means for introducing air into opposite sides of said second compartment, said wall having an opening therein for the flow of air from said second compartment to the first mentioned compartment, a radiator disposed in said opening, and an engine in the first mentioned compartment operatively connected to said radiator.

WILLIAM B. STOUT.